United States Patent [19]

Shikada

[11] Patent Number: 5,301,053
[45] Date of Patent: Apr. 5, 1994

[54] METHOD FOR TRANSMISSION AND RECEIPT OF COHERENT LIGHT SIGNALS

[75] Inventor: Minoru Shikada, Tokyo, Japan

[73] Assignee: NEC Corporation, Tokyo, Japan

[21] Appl. No.: 803,417

[22] Filed: Dec. 6, 1991

[30] Foreign Application Priority Data

Dec. 6, 1990 [JP] Japan ............................ 2-406331
May 10, 1991 [JP] Japan ............................ 3-135500

[51] Int. Cl.⁵ .......................................... H04J 14/02
[52] U.S. Cl. .................................. 359/125; 359/114; 359/173; 359/191
[58] Field of Search ............... 359/114, 126, 173, 190, 359/191, 125; 455/75, 85, 86, 87

[56] References Cited

U.S. PATENT DOCUMENTS 5,121,241 6/1992 Veith ..................... 359/152

FOREIGN PATENT DOCUMENTS

| 0294133 | 5/1988 | European Pat. Off. |
| 0298598 | 6/1988 | European Pat. Off. |
| 0354567 | 8/1989 | European Pat. Off. |
| 0114340 | 5/1987 | Japan ................... 359/191 |
| 0099636 | 4/1988 | Japan ................... 359/191 |
| 0054032 | 5/1988 | Japan ................... 359/114 |
| 0126036 | 5/1989 | Japan ................... 359/191 |
| 0147437 | 6/1989 | Japan ................... 359/191 |

Primary Examiner—Leslie Pascal
Attorney, Agent, or Firm—Sughrue, Mion, Zinn, Macpeak & Seas

[57] ABSTRACT

Each subscriber is provided with an optical heterodyne detection circuit. An oscillation light of an optical local oscillator is divided to a local oscillation light for the heterodyne detection and a transmitting light for data communication. A channel for those lights is selected from vacant communication channels. The transmitting light may be obtained from a transmission light oscillator which is controlled by a control unit common to the optical local oscillator.

7 Claims, 12 Drawing Sheets 5,301,053

METHOD FOR TRANSMISSION AND RECEIPT OF COHERENT LIGHT SIGNALS

FIELD OF THE INVENTION

This invention relates to a method for transmission and receipt of coherent light signals used in optical fiber communications, and more particularly to, a method for transmission and receipt of coherent light signals in which a wavelength of the signal lights is precisely controlled to be selected.

BACKGROUND OF THE INVENTION

Optical fiber communication systems have been developed quickly as communication systems having excellent characteristics of high speed modulation and long distance communications. Especially, a coherent optical communication system, in which optical frequency modulation or optical phase modulation is carried out in a transmitting apparatus and the optical signals are detected by optical heterodyne detection in a receiving apparatus, has been attractive among such optical fiber communication systems for its high receiving sensibility in high density frequency division multiplexing which contribute to a large capacity communication as well as a long distance communication. The high density frequency division multiplexing communication method is expected to realize extremely fine motion picture communications, in which it is possible to provide many subscribers with communication services by a relatively small number of stations and a small scale of transmission facilities.

In the coherent optical communication between subscribers and the station by using the high density frequency division multiplexing method, a communication method with a network topology of double star type in which each subscriber is allocated with a predetermined wavelength of optical signals has been reported. In such communication method, it is possible to transmit different kinds of information to different subscribers simultaneously, although it is impossible in a network of tree type topology adopted in CATV now in use, however, a number of wavelength channels corresponding to a number of subscribers are required, so that usage efficiency of wavelengths is not high. In order to improve the usage efficiency, there is a communication method in which a vacant wavelength channel available for communication is selected to be used as a channel in case of each talking occasion without allocating a specific wavelength to each subscriber. Such a communication method is called as Demand Assign frequency division multiplexing method already open to public. This communication method has an advantage in that the number of wavelength channels required in the communication is less than the number of subscribers, so that the usage efficiency of wavelengths increases and station facilities are not required to be large in number and scale.

According to the conventional method for transmission and receipt of coherent light signals, however, there is a disadvantage in that there is no study and report on means in a subscriber for setting a wavelength of a transmitting light source, and adjusting the wavelength to an absolute wavelength for a reference wavelength or a selected wavelength of the station in bilateral communications. In the Demand Assign wavelength division multiplexing communication method, it is required to select a wavelength for communication in each call, so that each subscriber is required to prepare a receiver and a transmitter of wavelength selecting type. A receiver of wavelength selecting type for unilateral communications has been described in detail in Japanese Patent Publication No. KOKAI 1-77325. In this receiver of wavelength selecting type, it is possible to select a desired wavelength channel by controlling a current supplied to a local oscillating light source to be one of memorized currents. However, as explained above, there is no disclosure about transmitter or receiver for bilateral communications.

SUMMARY OF THE INVENTION

Accordingly, it is an object of the invention to provide a method for transmission and receipt of coherent light signals in which it is possible in a subscriber to set a wavelength of a local oscillating light source to an absolute wavelength and a selected wavelength of a station.

It is a further object of the invention to provide a method for transmission and receipt of coherent light signals in which an absolute wavelength for a local oscillating light source and a transmitting light source is stabilized in a bilateral communication system.

It is a still further object of the invention to provide a method for transmission and receipt of coherent light signals in which the setting of a wavelength is easily carried out in a bilateral communication system.

According to a feature of the invention, a method for transmission and receipt of coherent light signals comprises the steps of:

providing a station and subscribers connected to each other to transmit and receive coherent light signals of wavelength division multiplexing by optical fibers:

providing an oscillation light having a first predetermined wavelength which is divided to first and second light signals in one of the subscribers:

transmitting the first light signal from the one of the subscribers to the station:

receiving a third light signal having a second predetermined wavelength transmitted from the station in the one of the subscribers: and combining the second light signal and the third light signal to provide an intermediate light signal which is converted to an intermediate electric signal, the intermediate electric signal being demodulated to provide data transmitted from the station to the one of the subscribers.

BRIEF DESCRIPTION OF THE DRAWINGS

The invention will be explained in more detail in conjunction with appended drawings wherein.

DESCRIPTION OF THE PREFERRED EMBODIMENTS

Figure 1:
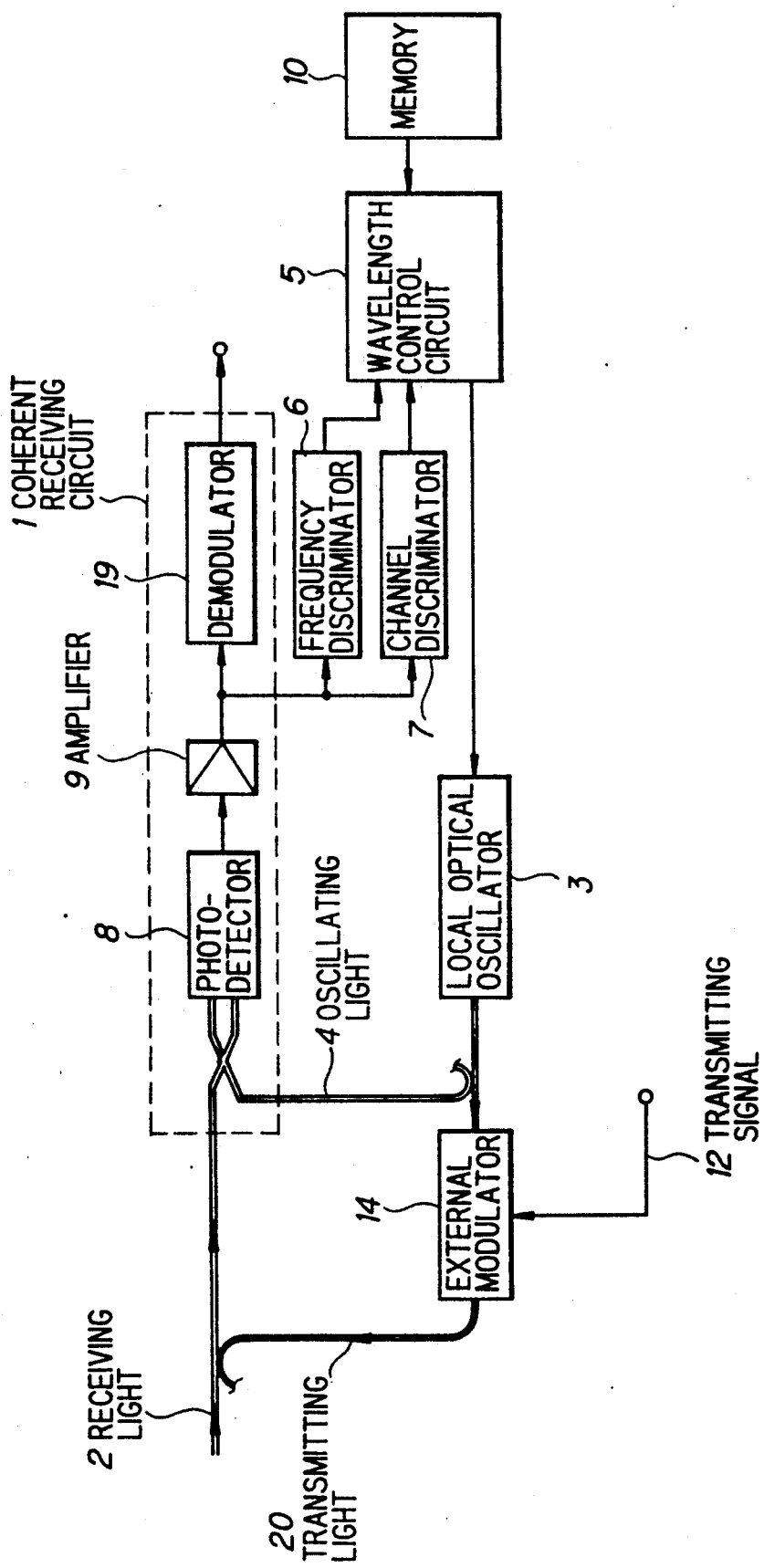
FIG. 1 is a block diagram of a transmitting and receiving apparatus used in a method for transmission and receipt of coherent light signals in a first preferred embodiment according to the invention.

FIG. 1 shows a transmitting and receiving apparatus used in a method for transmission and receipt of coherent light signals in a first preferred embodiment according to the invention. The transmitting and receiving apparatus includes a coherent receiving circuit 1, a local optical oscillator 3, a wavelength control circuit 5, a frequency discriminator 6, a channel discriminator 7, and an external modulator 14 of lithium niobate. The coherent receiving circuit 1 includes a photodetector 8, an amplifier 9 and a demodulator 19.

In operation, a receiving light 2 transmitted from a station is combined with an oscillating light 4 supplied by a local optical oscillator 3 to be supplied to the photodetector 8 where heterodyne detection is carried out to generate an intermediate signal. The intermediate signal is amplified by the amplifier 9, and then demodulated by the demodulator 19.

The wavelength control circuit 5 controls the local optical oscillator 3 to generate an oscillating light 4 corresponding to a wavelength of a received channel which is discriminated by the channel discriminator 7. In more detail, the wavelength control circuit 5 controls the local optical oscillator 3 to oscillate width a predetermined wavelength by setting currents for temperature control and for oscillation control to be values determined in accordance with data of relations of temperatures and currents vs. oscillating wavelengths of the local optical oscillator 3 stored in the memory 10.

In this oscillation control, the wavelength control circuit 5 sweeps wavelength of the oscillating light of the local optical oscillator 3 in a narrow range to pull the intermediate frequency signal into a predetermined range of frequencies in accordance with a frequency discriminating signal supplied from the frequency discriminator 6. At the same time, the channel discriminator 7 discriminates a channel from others by detecting a pilot signal having a specific frequency band of 10 MHz included in each channel signal light. If the channel received is not a desired one, then the wavelength control circuit 5 receives a signal from the channel discriminator 7 to detect difference of wavelengths between the tuned channel and the desired one to correct a current supplied to the local optical oscillator 3. Such a control is carried out by a microprocessor included in the wavelength control circuit 5.

On the other hand, the transmitting signal 12 is supplied to the external modulator 14 to modulate a part of the oscillating light supplied from the local optical oscillator 3 and intensity modulation is carried out in the external modulator 14 and the modulated signal light 20 is transmitted to the station through an optical fiber transmission line 20.

Figure 2:
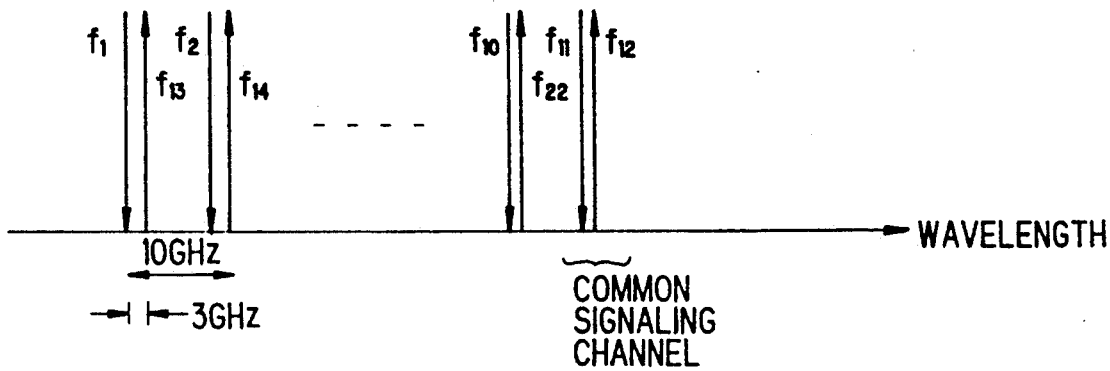
FIG. 2 is an explanatory view explaining wavelength allocation of lights for communication in the method for transmission and receipt of coherent light signals in the first preferred embodiment according to the invention.

FIG. 2 shows wavelength allocation of lights for communication. Wavelengths $f_i$ to $f_{10}$ are allocated to receiving lights (down line signals) for subscribers, while wavelengths $f_{12}$ to $f_{22}$ are allocated to transmitting lights (up line signals). Each wavelength pair $f_i$ and $f_{i+12}$ ($i = 1, 2, \ldots, 10$) is used for one bilateral communication between two subscribers by control of the station. Among the wavelength pairs, the wavelength pair $f_{11}$ and $f_{12}$ is used for a common signaling channel by which line control signals are transmitted from a subscriber of a caller to the station and from the station to a subscriber of a caller to set up a bilateral communication between the subscribers of the caller and callee.

Figure 3:
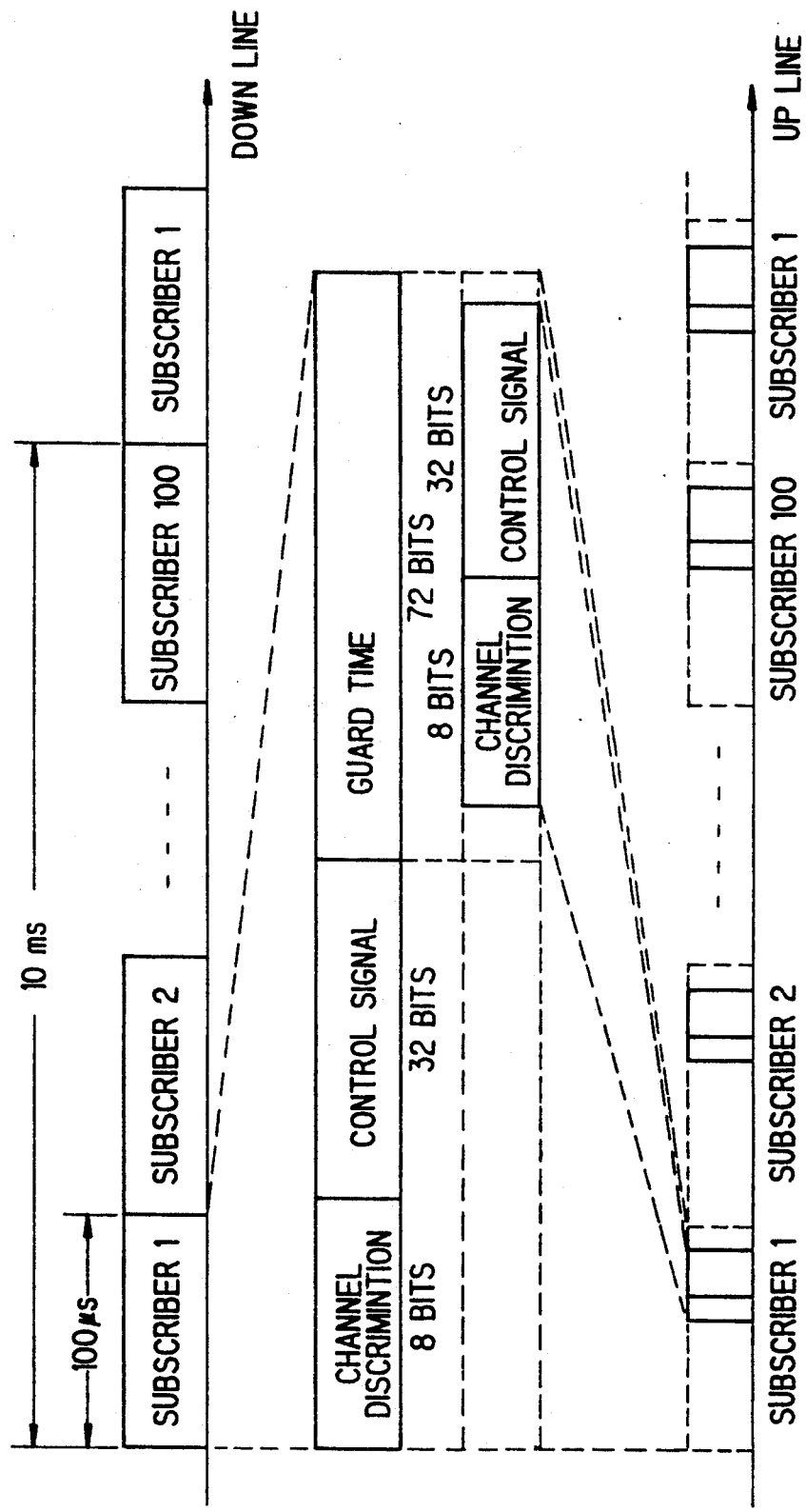
FIG. 3 is an explanatory view explaining signal format structures of a common signalling channel in the method for transmission and receipt of coherent light signals in the first preferred embodiment according to the invention.

FIG. 3 shows time allocation and signal format structure of common signals in the common signaling channel in case of one hundred subscribers. Time division multiplexing access (TDMA) is adopted in transmitting control signals, so that each subscriber is allocated with a specific period (100 $\mu$m in FIG. 3) having an interval of 10 ms to communicate with the station. Each period for one subscriber in the down line from the station is divided to three regions. first one for channel discrimination (8 bits), second one for control signal (32 bits) and third one for guard time (72 bits). As for the up line, a subscriber can use the guard time to avoid interferences with other subscribers. The period is divided to two regions, first one for channel discrimination (8 bits) and second one for control signal (32 bits). When a subscriber of a caller sends a call request signal to the station for requesting a call to a subscriber of a callee, the station selects one wavelength pair from the aforementioned pairs and sends the control signal for selecting a wavelength to the subscriber of the caller and informs the subscriber of the callee of the call request.

Figure 4:
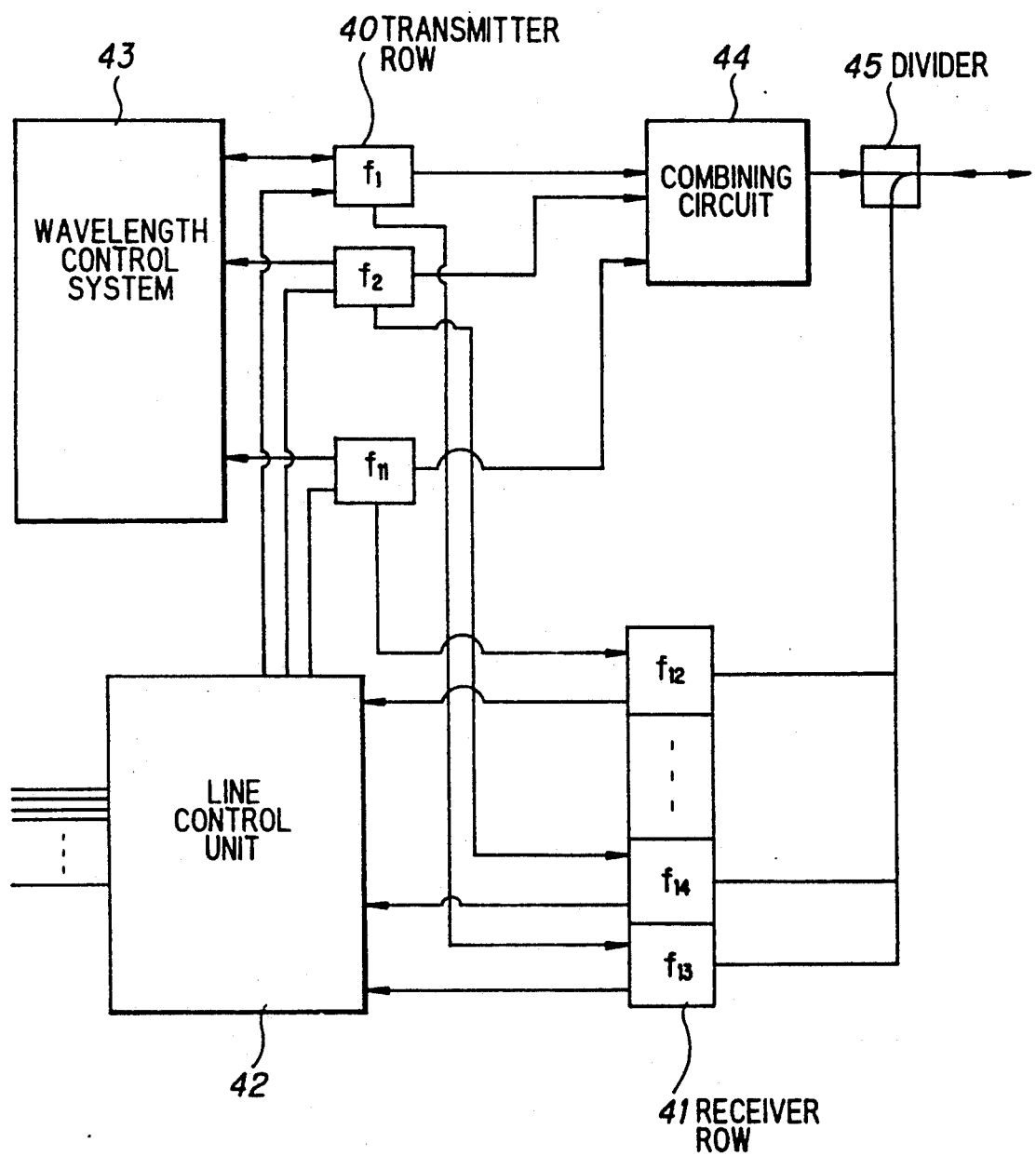
FIG. 4 is a block diagram of a transmitting and receiving circuit in a station in the method for transmission and receipt of coherent light signals in the first preferred embodiment according to the invention.

FIG. 4 shows a transmitting and receiving apparatus in the station. The transmitting and receiving apparatus includes a transmitter row 40, a receiver row 41, a line control unit 42, a wavelength control system 43, a combining circuit 44, and a divider 45. Wavelengths $f_i$ to $f_{11}$ of transmitting lights supplied from the transmitter row 40 are stabilized to be absolute wavelengths by the wavelength control system 43. Such a stabilization to the absolute wavelengths is described on page 396 of Journal of Lightwave Technology, vol. 3, 1990, titled "A Coherent Optical FDM CATV Distribution System" by S. Yamazaki, et al. On the other hand, receiving lights supplied from subscribers are supplied through the divider 45 to receivers of the receiver row 41 each corresponding to a specific wavelength selected from up line wavelengths $f_{12}$ to $f_{22}$. CW optical signals are supplied from the transmitter row 40 to receiving circuits of the receiver row 41 as local oscillating lights, so that intermediate signals are generated in the receiver row 41 to be supplied to the line control unit 42. The line control unit 42 controls signals of the transmitter and receiver rows 40 and 41 to carry out operation set out below.

Figure 5:
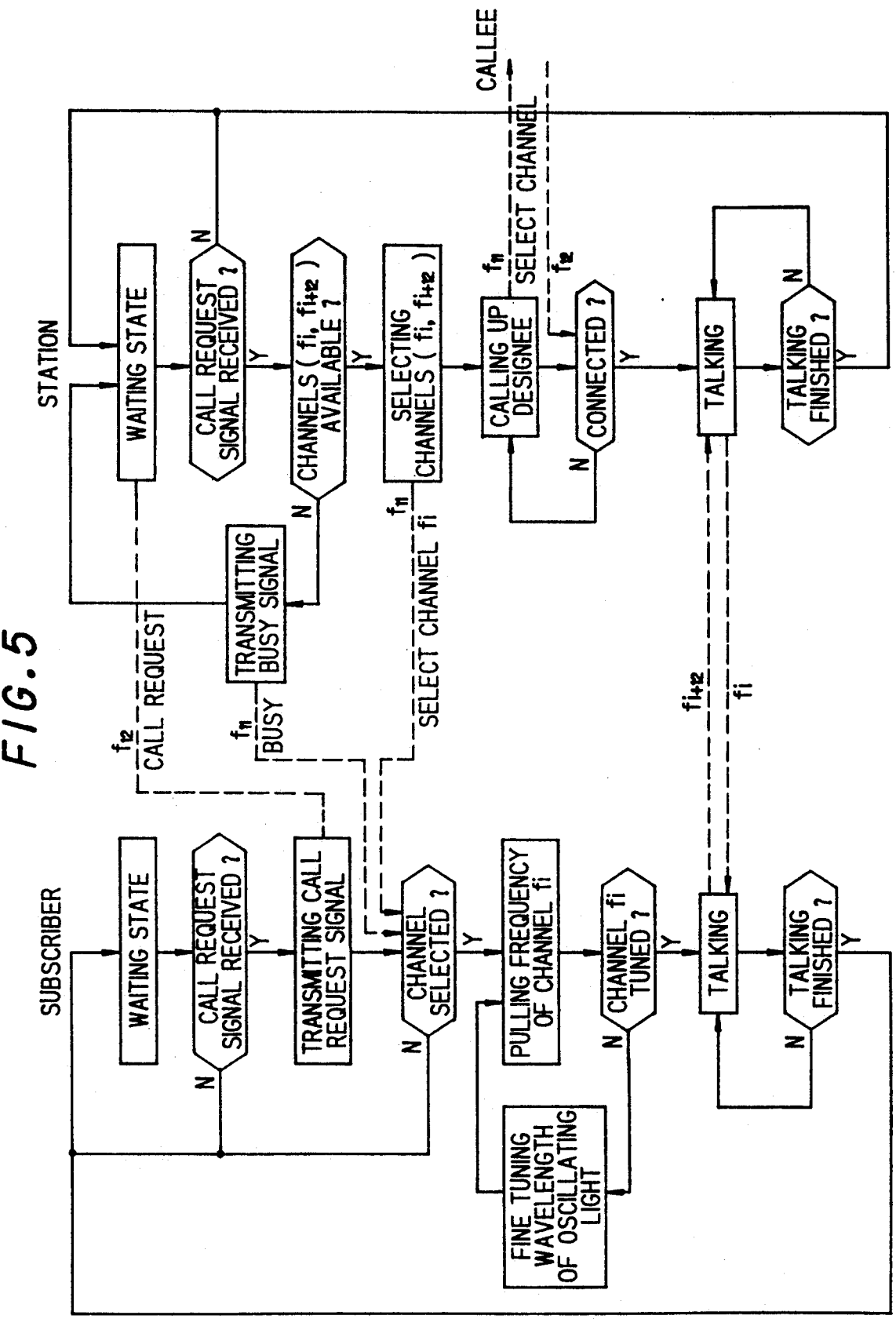
FIG. 5 is a flow chart of transmitting operation from a subscriber in the method for transmission and receipt of coherent light signals in the first preferred embodiment according to the invention.
Figure 6:
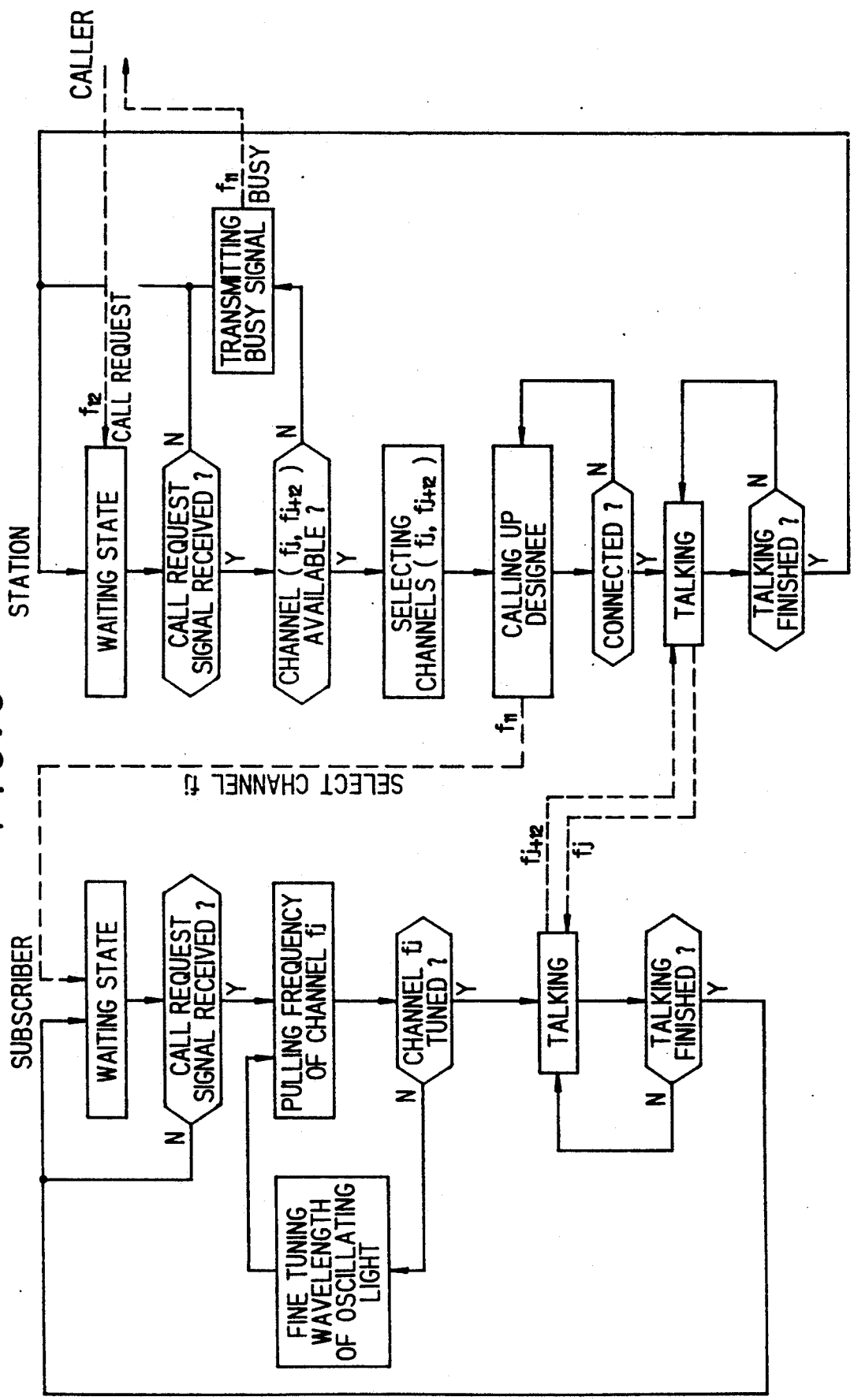
FIG. 6 is a flow chart of receiving operation by a subscriber in the method for transmission and receipt of coherent light signals in the first preferred embodiment according to the invention.

FIG. 5 is a flow chart of requesting a call from a subscriber in the transmitting and receiving apparatus shown in FIG. 1. At non-communication state, the receiving circuit 1 is kept waiting a call from other subscribers by receiving the common signaling channel $f_{11}$ from the station by tuning the local optical oscillator 3 to the frequency $f_{12}$. When the subscriber requests a call to one of the other subscribers, the oscillating light is modulated to include a subscriber number of a callee. The request signal is transmitted to the station by use of the common signaling channel of $f_{12}$. The station selects a channel having frequencies $f_i$ and $f_{i+12}$ from vacant channels, and the selected channel is transmitted to the subscriber of the caller. Simultaneously, the subscriber of the callee is requested to be connected to the station using wavelength $(f_j, f_{i+12})$ as shown in FIG. 6. At the subscriber (caller), the local optical oscillator 3 is controlled to oscillate with the frequency $f_{i+12}$ by the wavelength control circuit 5. As a result, a communication line is set up to use the selected channel between the subscribers of the caller and callee by control of the station. As understood from FIG. 2, the frequency $f_i$ is for the down line, and the frequency $f_{i+12}$ is for the up line. Thus, data communication starts between the two subscribers, and when it finishes, the same operation restarts.

FIG. 6 is a flow chart of receiving a call request from a subscriber in the transmitting and receiving device shown in FIG. 1. At non-communication state, the station and subscribers remain at the waiting state. When the station receives a call request from one of the subscribers by using the up line frequency $f_{11}$ of the common signaling channel, the station selects a channel having down and up line frequencies $f_i$ and $f_{i+12}$ from vacant channels. The selected channel is transmitted to the subscriber of a callee by using the down line frequency $f_{11}$ of the common signaling channel. In the subscriber of the callee, the local optical oscillator 3 is controlled to oscillate with the frequency $f_{i+12}$ by the wavelength control circuit 5. In the same manner as explained in FIG. 5, the communication starts between the two subscribers of the caller and callee by control of the station.

Figure 7:
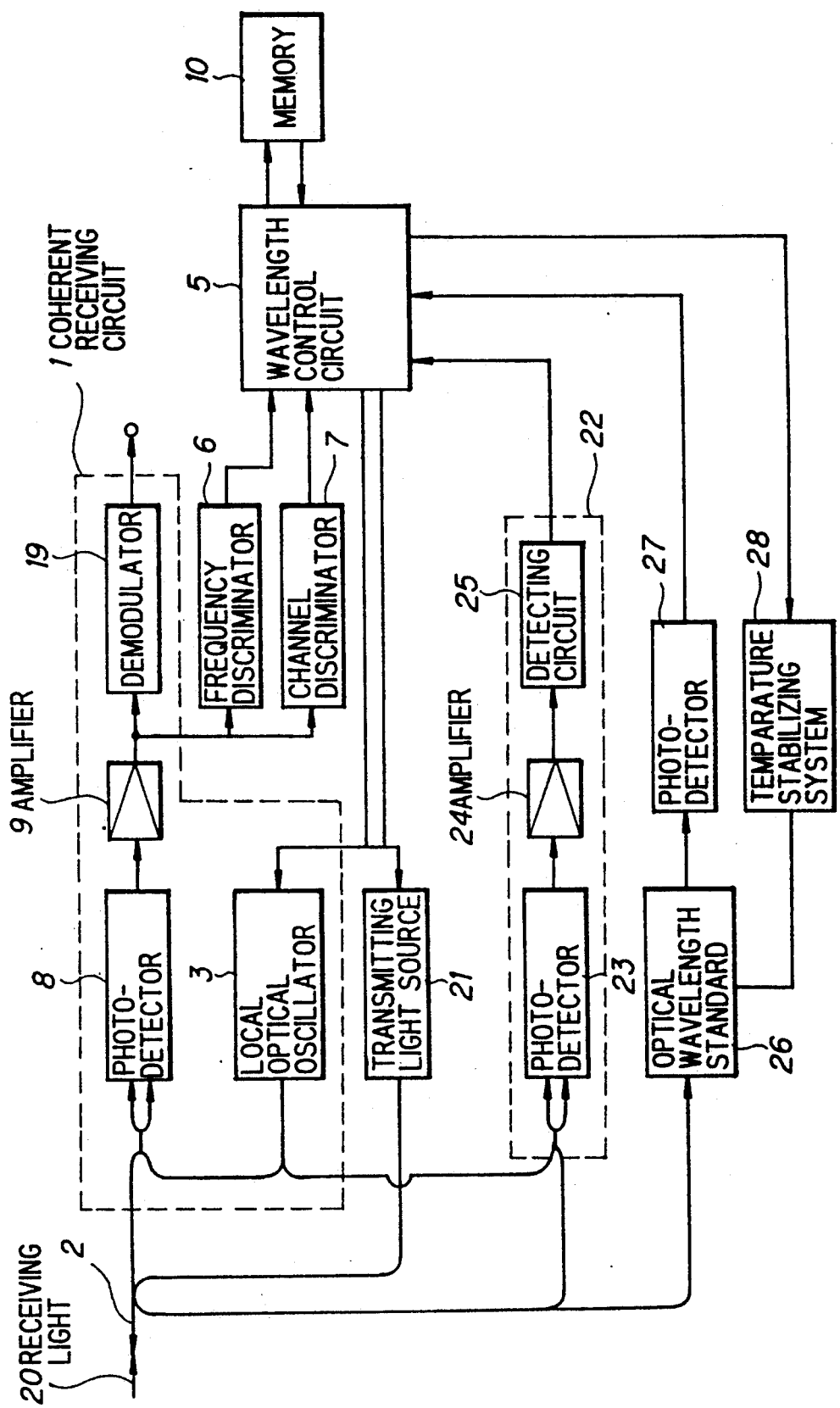
FIG. 7 is a block diagram of a transmitting and receiving device used in a method for transmission and receipt of coherent light signals in a second preferred embodiment according to the invention.

FIG. 7 shows a transmitting and receiving apparatus used in a method for transmission and receipt of coherent light signals in a second preferred embodiment according to the invention. The transmitting and receiving apparatus includes a coherent receiving circuit 1, a wavelength control circuit 5, a frequency discriminator 6, a channel discriminator 7, a memory 10, a transmitting light source 21, a detecting circuit 22, an optical wavelength standard 26, a photodetector 27, and a temperature stabilizing system 28. The coherent receiving circuit 1 includes a photodetector 8, an amplifier 9, a demodulator 19 and a local optical oscillator 3. The detecting circuit 22 includes a photodetector 23, an amplifier 24 and a frequency discriminator 25.

Figure 8A:
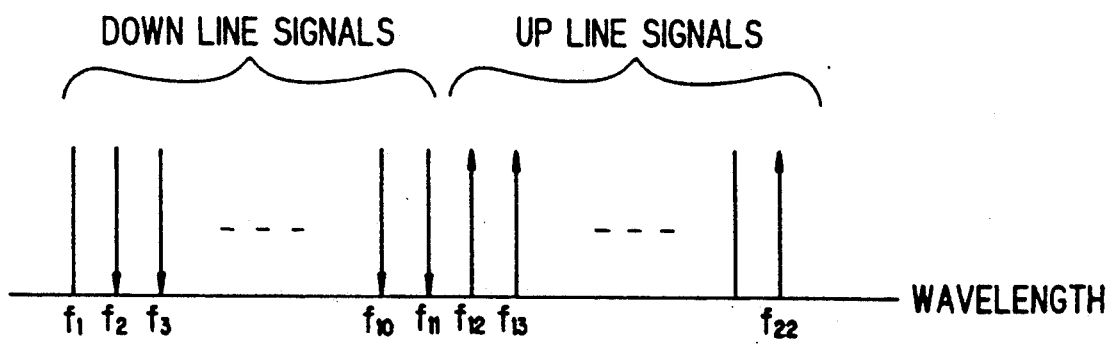
FIG. 8A and 8B are explanatory views explaining wavelength allocation of lights for communication in the method for transmission and receipt of coherent light signals in the second preferred embodiment according to the invention.
Figure 8B:
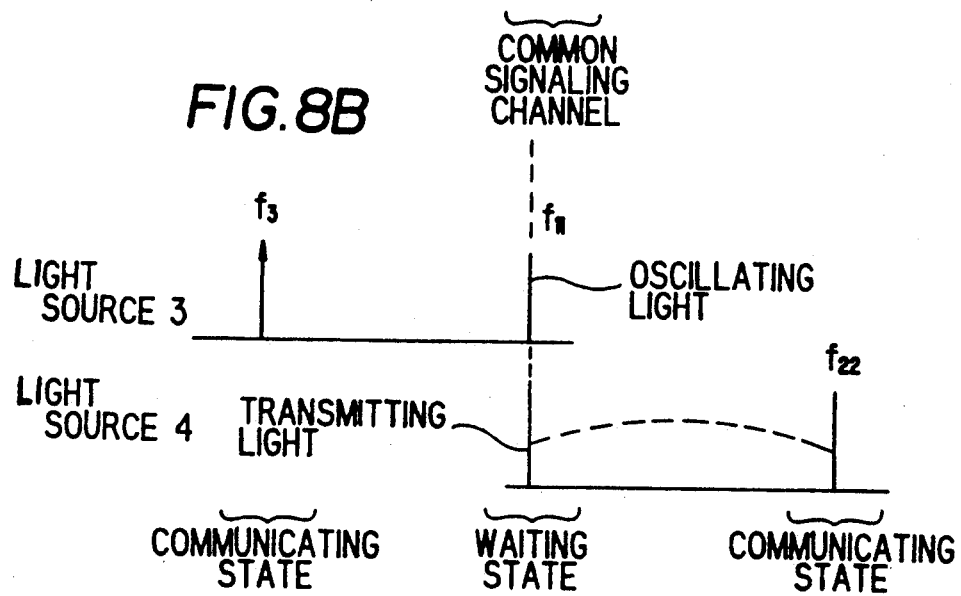

In this second preferred embodiment, non-correlated wavelengths $f_i$ and $f_j$ are selected for down and up line signals as shown in FIG. 8A ($i=1, 2, \ldots, 11$, and $j=12, 13, \ldots, 22$). For this purpose, the local optical oscillator 3 oscillates to provide lights having wavelengths $f_i$ to $f_{11}$, and the transmitting light source 21 provides lights having wavelengths $f_{11}$ to $f_{22}$ as shown in FIG. 8B.

Figure 9A:
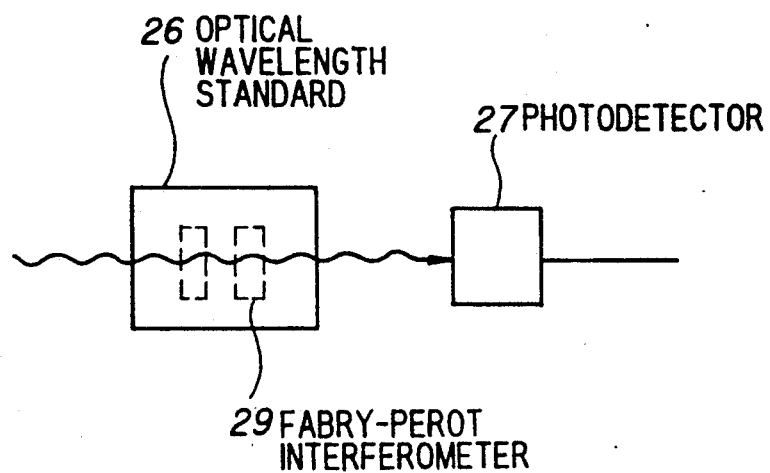
FIG. 9A is an explanatory view illustrating transmitting a light through an optical wavelength standard used in the transmitting and receiving apparatus in FIG. 7.
Figure 9B:
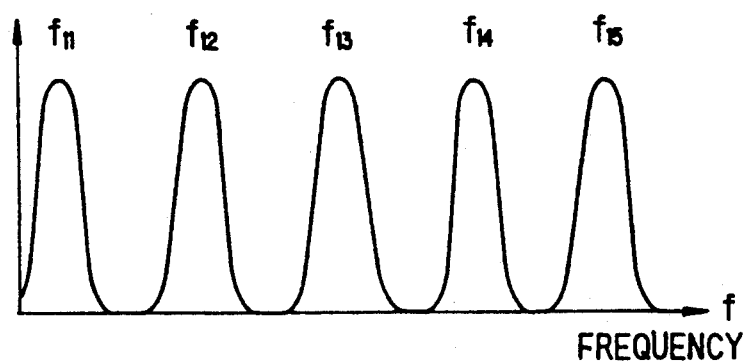
FIG. 9B is a graph showing a relation between frequency and intensity of lights in the optical wavelength standard in FIG. 8A.

FIG. 9A shows operation of the optical wavelength standard 26 which includes a Fabry-Perot interferometer 29. The free spectrum range of the Fabry-Perot interferometer 29 is set to meet the wavelengths of up line signals $f_{11}$ to $f_{22}$, as shown in FIG. 9B. At the waiting state, the temperature around the optical wavelength standard 26 is stabilized by the temperature stabilizing system 28 so that the transmission peaks are equal to wavelengths of the transmitting lights. At communication state, the temperature stabilizing system 28 becomes at hold state, however, the wavelengths of the transmission peaks remain stabilized with a few $MH_2$ changes for a few hours.

In this second preferred embodiment, TDMA is adopted in transmitting control signals as like in the first preferred embodiment, and the signal format structure of the common signaling channels are the same as those shown in FIG. 3. In addition, the structure of the transmitting and receiving circuit of the station is the same as that in FIG. 4, except that local optical oscillators are additionally provided for the receiver row.

Figure 10:
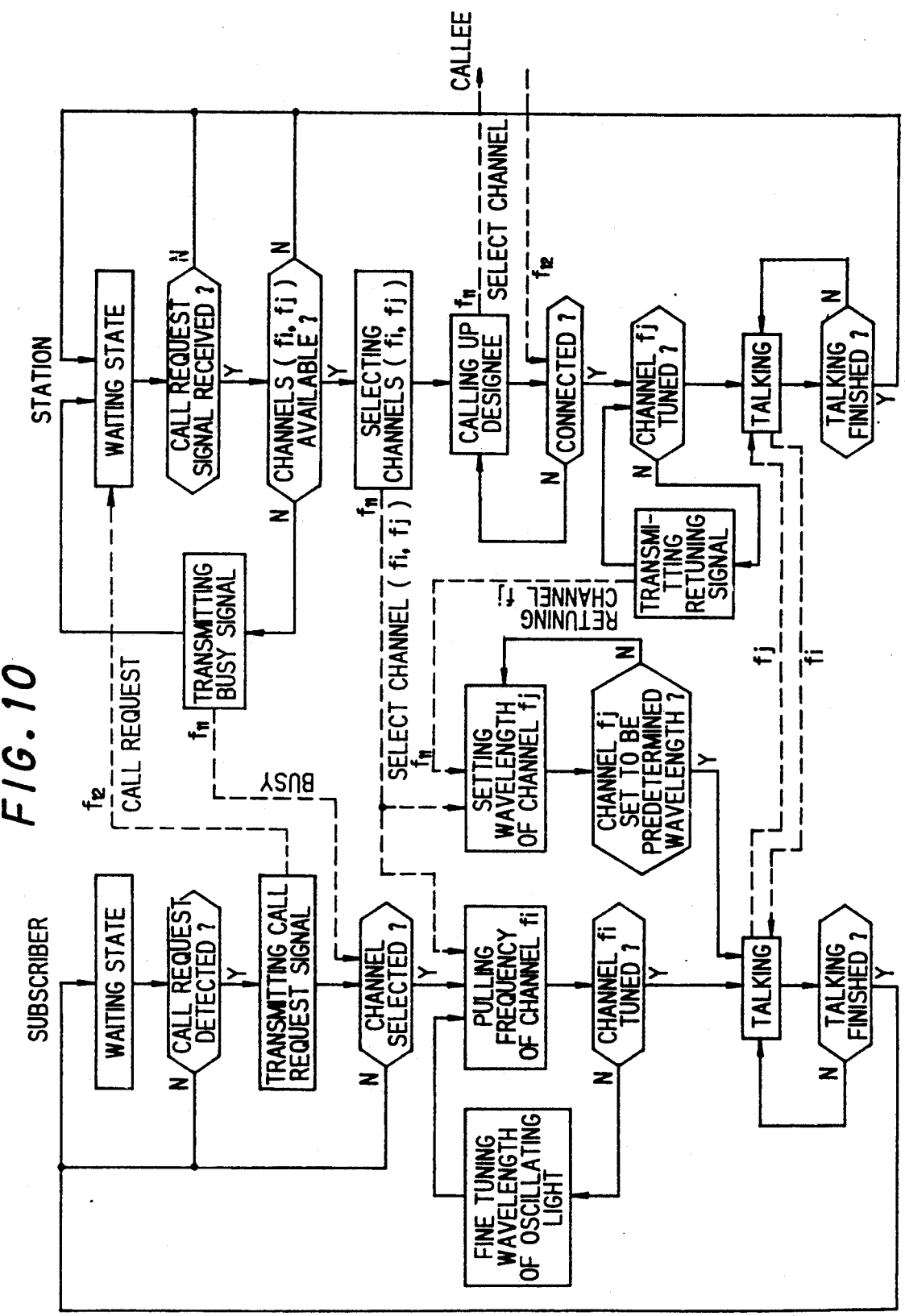
FIG. 10 is a flow chart of transmitting operation from a subscriber in the method for transmission and receipt of coherent light signals in the second preferred embodiment according to the invention.
Figure 11:
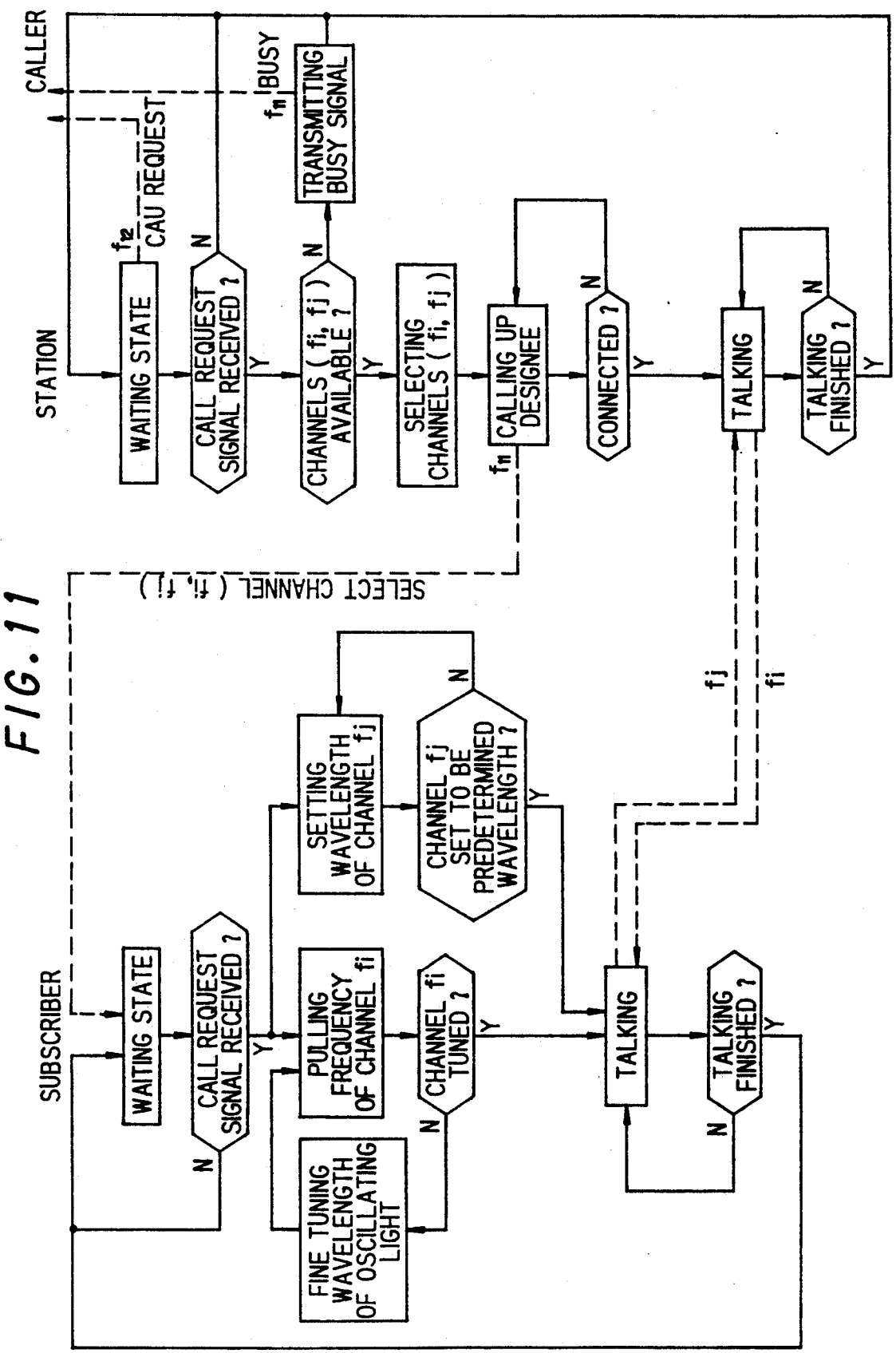
FIG. 11 is a flow chart of receiving operation by a subscriber in the method for transmission and receipt of coherent light signals in the second preferred embodiment according to the invention.

FIGS. 10 and 11 are flow charts of transmitting and receiving operations in the transmitting and receiving apparatus shown in FIG. 7, respectively. The operations are the same as those in FIGS. 5 and 6 respectively, except that some steps are added for setting wavelength of the channel $f_j$ used for a transmitting light. In the step of fine tuning of the oscillating light, the transmission outputs of the optical wavelength standard 26 changes periodically while sweeping of wavelengths, so that it can be judged whether the channel is the desired one by counting the number of the transmission peaks. On the other hand, the station also judges whether the channel is the desired one. When the desired wavelength is selected, the wavelength of transmitting lights is stabilized by the wavelength control circuit 5.

Operation of FIG. 10 is summarized as set out below. When a call request is made in one of subscribers, the call request is transmitted from the transmitting light source 4 emitting the light of the wavelength $f_{12}$ to the station. Then, a channel having the wavelength $f_i$ and $f_j$ is selected from vacant channels in the station. This selected channel is transmitted from the station back to the subscriber by use of the light of the wavelength $f_{11}$, so that the local optical oscillator 3 is controlled to be pulled into the $f_1$ channel by the wavelength control circuit 5. At the same time, the transmitting light source 21 is controlled to oscillate with the wavelength $f_i$ by the wavelength control circuit 5. In this control, a frequency signal is supplied from the detecting circuit 22 to the wavelength control circuit 5, and a transmission peak signal is supplied to be counted in the wavelength control circuit 5 from the photodetector 27 thereto.

Thus, the setting of the wavelength $f_j$ is completed in the transmitting light source 21.

FIG. 11 shows operation in which one of subscribers receives a call request from the other subscriber. This operation is self-explanatory with reference to the flow-chart, and also to the operation of FIG. 10.

Figure 12A:
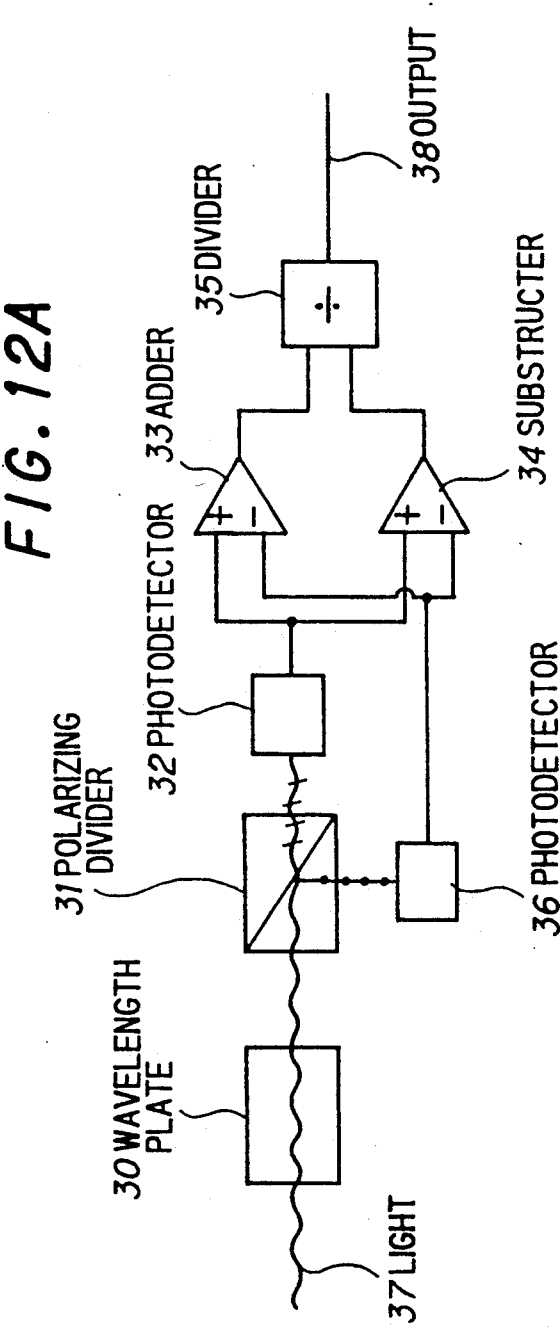
FIG. 12A is a block diagram of an optical wavelength standard in a transmitting and receiving circuit in a third preferred embodiment according to the invention.

FIG. 12A shows an optical wavelength standard in a transmitting and receiving circuit in a third preferred embodiment according to the invention. The optical wavelength standard includes a wavelength plate 30, a polarizing divider 31, photodetectors 32 and 36, an adder 33, a subtractor 34 and a divider 35.

Figure 12B:
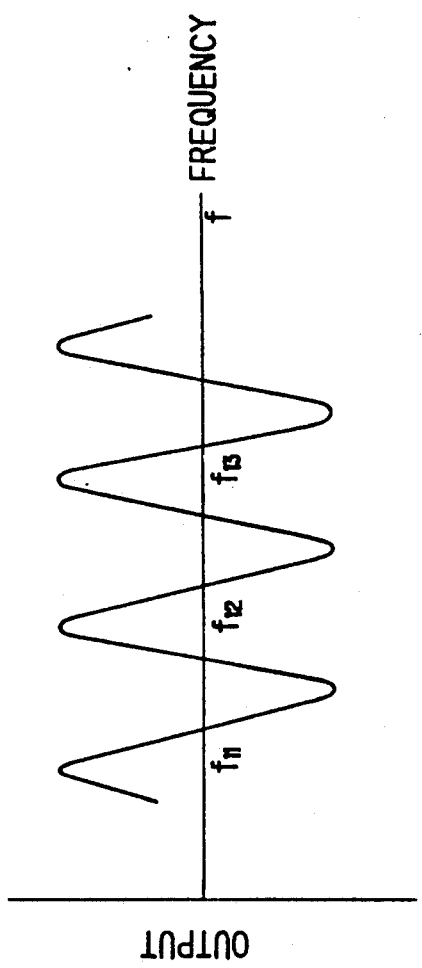
FIG. 12B is a graph showing a relation between the frequency and the output intensity in the optical wavelength standard in FIG. 12A.

In the optical wavelength standard, a light 37 is supplied to the wavelength plate 30 in the direction of 45° to the plate plain, and then is transmitted therethrough to the polarizing divider 31 where the light 37 is divided to two lights to be supplied to the photodetectors 32 and 36 respectively. Outputs of the photodetectors 32 and 36 are processed arithmetically by the adder 33, the subtractor 34 and the divider 35, and an output 38 having periodic characteristic can be obtained, as shown in FIG. 12B. Stabilization of the wavelength can be realized by targeting the wavelengths to the cross points of zero level with a relatively simple control system as compared with a Fabry-Ferot interferometer having transmission peaks. Such an optical wavelength standard is described in Japanese Patent Application No. 1-226863.

In the preferred embodiments thus explained above, wavelengths of both down and up line signals are controlled, however, it is possible to adopt a system in which wavelengths of only down line signals are controlled. At the waiting state, the wavelength of the transmitting light is synchronized with the common signaling channel $f_{11}$ in the second preferred embodiment, however, it is possible to set the beat frequency of the detecting circuit 22 so that the wavelength thereof is synchronized with the common signaling channel $f_{12}$. The transmitting light source may remain at the waiting state, or may be built up at each time when the light transmission begins to search the wavelength of the common signaling channel. Control of periods of the wavelengths may be carried out by a system having a periodical transmission or reflective characteristic such as a Mach-Zender interferometer. It is possible to separate a swept signal light from the transmitting line by using an optical switch to avoid interference to transmitting lights from other subscribers.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A method for transmission and receipt of coherent light signals, comprising the steps of:
   providing a station and subscribers connected to each other to transmit and receive coherent light signals of wavelength multiplexing by optical fibers;
   providing an oscillation light signal having a first predetermined wavelength in one of said subscribers;
   transmitting a first light signal having a second predetermined wavelength from said one of said subscribers to said station;
   transmitting a second light signal having a third predetermined wavelength from said station to said one of said subscribers;
   combining said second light signal and said oscillation light signal to provide an intermediate light signal;
   converting said intermediate light signal to an intermediate electric signal; and
   demodulating said intermediate electric signal to provide data transmitted from said station to said one of said subscribers, wherein:
   at least one of said oscillation light signal and said first light signal is used to correct a reference wavelength during a non-communication state between said station and said one of said subscribers, and wherein a wavelength of said first light signal is set based on said reference wavelength during a communication state between said station and said one of said subscribers.

2. A method for transmission and receipt of coherent light signals, comprising the steps of:
   providing a station and subscribers connected to each other to transmit and receive coherent light signals of wavelength division multiplexing via optical fibers;
   providing an oscillation light having a first predetermined wavelength which light is divided into first and second light signals at one of said subscribers;
   transmitting over a common signaling channel said first light signal from said one of said subscribers to said station;
   transmitting over said common signaling channel a third light signal having a second predetermined wavelength from said station to said one of said subscribers;
   combining said second light signal and said third light signal to provide an intermediate light signal;
   converting said intermediate light signal to an intermediate electric signal;
   demodulating said intermediate electric signal to provide data transmitted from said station to said one of said subscribers, wherein:
   said first and third light signals are assigned to a common signaling channel only during a non-communication state and during an initial stage of a communication state.

3. A method for transmission and receipt of coherent light signals, comprising the steps of:
   providing a station and subscribers connected to each other to transmit and receive coherent light signals of wavelength division multiplexing by optical fibers;
   providing an oscillation light having a first wavelength which light is divided into first and second light signals at one of said subscribers;
   transmitting over a common signaling channel said first light signal from said one of said subscribers to said station;
   transmitting over said common signaling channel a third light signal having a second wavelength from said station to said one of said subscribers;
   combining said second light signal and said third light signal to provide an intermediate light signal;
   converting said intermediate light signal into an intermediate electric signal;
   demodulating said intermediate electric signal to provide data transmitted from said station to said one of said subscribers;

shifting said first and second light signals to have a third wavelength and said third light signal, to have a fourth wavelength; and assigning said first and third shifted light signals to a communication channel different from said common signaling channel selected from vacant communication channels, wherein:

said first light signal having said first wavelength and said third light signal having said second wavelength are assigned to said common signaling channel only during a non-communication state and during an initial stage of a communication state.

4. A method for transmission and receipt of coherent light signals, according to claim 3, wherein:

shifting of said first and third wavelengths uses a wavelength of said common signaling channel as a reference wavelength.

5. A method for transmission and receipt of coherent light signals, comprising the steps of:

providing a station and subscribers connected to each other to transmit and receive coherent light signals of wavelength multiplexing by optical fibers;

providing an oscillation light signal having a first predetermined wavelength in one of said subscribers;

transmitting a first light signal having a second predetermined wavelength from said one of said subscribers to said station;

transmitting a second light signal having a third predetermined wavelength from said station to said one of said subscribers;

combining said second light signal and said oscillation light signal to provide an intermediate light signal;

converting said intermediate light signal to an intermediate electric signal;

demodulating said intermediate electric signal to provide data transmitted from said station to said one of said subscribers; and supplying said first light signal to a transmission member having a predetermined wavelength property to provide transmission peaks equal to a wavelength division of communication channels, said first light signal being swept in wavelength to be set to one of said communication channels by counting said transmission peaks.

6. A method for transmission and receipt of coherent light signals, comprising the steps of:

providing a station and subscribers connected to each other to transmit and receive coherent light signals of wavelength multiplexing by optical fibers;

providing an oscillation light signal having a first predetermined wavelength in one of said subscribers;

transmitting a first light signal having a second predetermined wavelength from said one of said subscribers to said station;

transmitting a second light signal having a third predetermined wavelength from said station to said one of said subscribers;

combining said second light signal and said oscillation light signal to provide an intermediate light signal;

converting said intermediate light signal to an intermediate electric signal;

demodulating said intermediate electric signal to provide data transmitted from said station to said one of said subscribers;

controlling said first and second predetermined wavelengths using a wavelength of a common signaling channel as a reference wavelength; and setting up a line connection between said one of said subscribers and another subscriber on a channel different from said common signaling channel; wherein:

said second predetermined wavelength is for an up line signal and said third predetermined wavelength is for a down line signal.

7. A method for transmission and receipt of coherent light signals, comprising the steps of:

providing a station and subscribers connected to each other to transmit and receive coherent light signals of wavelength multiplexing by optical fibers;

providing an oscillation light signal having a first predetermined wavelength in one of said subscribers;

transmitting a first light signal having a second predetermined wavelength from said one of said subscribers to said station;

transmitting a second light signal having a third predetermined wavelength from said station to said one of said subscribers;

combining said second light signal and said oscillation light signal to provide an intermediate light signal;

converting said intermediate light signal to an intermediate electric signal;

demodulating said intermediate electric signal to provide data transmitted from said station to said one of said subscribers;

assigning said first predetermined wavelength to a common signaling channel;

controlling a beat frequency between said oscillation light signal and said first light signal to be a predetermined value; and setting up a line connection between said one of said subscribers and a designated subscriber of said subscribers on a channel different from said common signaling channel.

* * * * *

UNITED STATES PATENT AND TRADEMARK OFFICE
CERTIFICATE OF CORRECTION

PATENT NO. : 5,301,053
DATED : April 5, 1994
INVENTOR(S) : Minoru SHIKADA

It is certified that error appears in the above-indentified patent and that said Letters Patent is hereby corrected as shown below:

Col. 4, line 50, delete "regions." and insert --regions,--.

Col. 5, line 33, delete "$f_i+12$" and insert --$f_j+12$--;

Col. 5, line 49, delete "$f_{11}$" and insert --$f_{12}$--.

Col. 6, line 63, delete "$f_i$" and insert --$f_j$--;

Signed and Sealed this

Twenty-eight Day of March, 1995

Attest:

BRUCE LEHMAN

*Attesting Officer*     *Commissioner of Patents and Trademarks*